United States Patent
Covell et al.

(10) Patent No.: US 11,016,656 B1
(45) Date of Patent: May 25, 2021

(54) FAULT RECOGNITION SELF-LEARNING GRAPHICAL USER INTERFACE

(71) Applicant: INTERNATIONAL BUSINESS MACHINES CORPORATION, Armonk, NY (US)

(72) Inventors: Jacob Thomas Covell, New York, NY (US); Robert Huntington Grant, Marietta, GA (US); Shikhar Kwatra, Durham, NC (US); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/791,322

(22) Filed: Feb. 14, 2020

(51) Int. Cl.
| | |
|---|---|
| *G06F 3/0488* | (2013.01) |
| *G06F 3/01* | (2006.01) |
| *G06K 9/00* | (2006.01) |
| *G06T 7/20* | (2017.01) |

(52) U.S. Cl.
CPC .......... *G06F 3/0488* (2013.01); *G06F 3/013* (2013.01); *G06K 9/00288* (2013.01); *G06T 7/20* (2013.01); *G06T 2207/30201* (2013.01)

(58) Field of Classification Search
CPC ... G06F 3/0488; G06F 3/013; G06K 9/00288; G06T 7/20; G06T 2207/30201
See application file for complete search history.

(56) References Cited

U.S. PATENT DOCUMENTS

| | | | |
|---|---|---|---|
| 5,565,894 A | 10/1996 | Bates | |
| 6,652,283 B1 * | 11/2003 | Van Schaack | G09B 7/00 434/236 |
| 9,855,947 B1 * | 1/2018 | Penilla | G08G 1/0129 |
| 9,910,542 B2 | 3/2018 | Ritchey | |
| 10,007,406 B1 * | 6/2018 | Libin | G06F 3/0484 |

(Continued)

FOREIGN PATENT DOCUMENTS

| | | |
|---|---|---|
| JP | H06309102 A | 11/1994 |
| KR | 20190104101 A | 9/2019 |

OTHER PUBLICATIONS

IBM, "Method to Save Touchscreen Panel by Distributing the Touch Load", An IP.com Prior Art Database Technical Disclosure, Feb. 13, 2009, 3 pages, IP.com No. IPCOM000179333D, Retrieved from the Internet: <URL: https://priorart.ip.com/IPCOM/000179333>.

(Continued)

*Primary Examiner* — Shourjo Dasgupta (74) *Attorney, Agent, or Firm* — Nicholas A. Welling (57) ABSTRACT

A computer-implemented method for optimizing object placement on a touchscreen graphical user interface when a distracted user selects incorrect coordinates. Through a variety of sensors, a device with a touchscreen graphical user interface may be able to survey the surrounding environment and distinguish specific types of stimuli, that may distract a touchscreen user. The method includes calculating a user distraction score based on the surrounding stimuli and associates it the coordinates of an object on the touchscreen and detecting if the user touched the screen at the wrong location. The placement of the object a user intended to engage on the touchscreen graphical user interface is corrected to the location which the user expects the object to be, based upon the user distraction score and the touchscreen coordinates which the user initially engaged.

12 Claims, 5 Drawing Sheets

(56) References Cited

U.S. PATENT DOCUMENTS

| | | | |
|---|---|---|---|
| 2004/0183749 A1* | 9/2004 | Vertegaal | G06F 3/013 |
| | | | 345/7 |
| 2005/0118996 A1 | 6/2005 | Lee | |
| 2006/0093998 A1* | 5/2006 | Vertegaal | H04N 7/18 |
| | | | 434/236 |
| 2015/0338915 A1* | 11/2015 | Publicover | H04N 5/44504 |
| | | | 345/633 |
| 2017/0262101 A1 | 9/2017 | Benbasat | |
| 2017/0358181 A1* | 12/2017 | Moussette | H04M 19/047 |
| 2020/0012382 A1 | 1/2020 | Lee | |

OTHER PUBLICATIONS

Mell et al., "The NIST Definition of Cloud Computing", National Institute of Standards and Technology, Special Publication 800-145, Sep. 2011, 7 pages.

"Artificial Intelligence Market Size & Share Report, 2020-2027", Grand View Research, Jul. 2020, 10 pages, <https://www.grandviewresearch.com/industry-analysis/artificial-intelligence-ai-market>.

"Touch Screens in the Industrial & Manufacturing Industries", Baanto, downloaded from the internet on Sep. 14, 2020, 5 pages, <https://baanto.com/industrial/>.

Quick, Darren, "IBM files patent application for morphing touch-screen keyboard interface", New Atlas, Jul. 25, 2011, 6 pages, <https://newatlas.com/ibm-morphing-touchscreen-keyboard/19313/>.

* cited by examiner

FAULT RECOGNITION SELF-LEARNING GRAPHICAL USER INTERFACE

BACKGROUND

The invention relates generally to graphical user interfaces, more specifically touchscreen graphical user interfaces and the ability to optimize object placement on the touchscreen based on the environmental conditions surrounding the user.

The use of graphical user interfaces, specifically touchscreens has grown tremendously in the past decade. This growth is due in part to the use of smartphones, tablets, and touchscreens in motor vehicles. Previously, with analog devices a user could engage tactile and sometimes hearing senses to interact with a device and institute a change, such as turning a knob or pressing a button. With touchscreens in particular, a user no longer has the ability to use these senses to guide her in engaging with the interface. This leave sight as the only sense a user can rely on when engaging with a touchscreen interface. If a user's sight is directed elsewhere when engaging with the touchscreen interface, other than the touchscreen itself, the user is in a sense blind and pressing the touchscreen where they believe the desired interface object is located.

SUMMARY

According to one aspect of the present invention, a computer-implemented method for optimizing object placement on a graphical user interface (GUI) touchscreen, the computer-implemented method comprising: determining a distraction level associated with a user based on at least one environmental sensor; calculating a user distraction score based on the level of distraction; receiving a first user input on a GUI touchscreen corresponding to a first object; receiving a second user input on the GUI touchscreen, corresponding to the first object, within a predetermined time threshold; determining if the second user input reverses the first user input; if responsive to the second user input reversing the first user input; receiving a third user input on the GUI touchscreen corresponding to a second object on the GUI touchscreen; determining if the third user input is received within a predetermined threshold of receiving the second user input; if responsive to the third user input being received within the predetermined threshold of the second user input, analyzing the second object based on the distraction score; a first set of coordinates associated with the first user input and a second set of coordinates associated with the third user input and adjusting the second object based on the analysis.

According to another aspect of the present invention, a computer program product for optimizing object placement on a GUI touchscreen, the program product comprising: one or more non-transitory computer readable storage media and program instructions stored on the one or more non-transitory computer readable storage media, the program instructions comprising: program instructions to determine a distraction level associated with a user based on at least one environmental sensor; program instructions to calculate a user distraction score based on the level of distraction; program instructions to receive a first user input on a GUI touchscreen corresponding to a first object; program instructions to receive a second user input on the GUI touchscreen within a predetermined time threshold; program instructions to determine if the second user input reverses the first user input; if responsive to the second user input reversing the first user input, program instructions to receive a third user input on the GUI touchscreen corresponding to a second object on the GUI touchscreen; program instructions to determine if the third user input is received within a predetermined threshold of receiving the second user input; if responsive to the third user input being received within the predetermined threshold of the second user input, program instructions to analyze the second object based on the distraction score, a first set of coordinates associated with the first user input and a second set of coordinates associated with the third user input; and program instructions to adjust the second object based on the analysis.

According to another aspect of the present invention, a computer system for optimizing object placement on a GUI touchscreen, comprising: one or more computer processors; one or more computer readable storage media; computer program instructions; the computer program instructions being stored on the one or more computer readable storage media for execution by the one or more computer processors; and the computer program instructions including instructions comprising: program instructions to determine a distraction level associated with a user based on at least one environmental sensor; program instructions to calculate a user distraction score based on the level of distraction; program instructions to receive a first user input on a GUI touchscreen corresponding to a first object; program instructions to receive a second user input on the GUI touchscreen within a predetermined time threshold; program instructions to determine if the second user input reverses the first user input; responsive to the second user input reversing the first user input, program instructions to receive a third user input on the GUI touchscreen corresponding to a second object on the GUI touchscreen; program instructions to determine if the third user input is received within a predetermined threshold of receiving the second user input; responsive to the third user input being received within the predetermined threshold of the second user input, program instructions to analyze the second object based on the distraction score, a first set of coordinates associated with the first user input and a second set of coordinates associated with the third user input and program instructions to adjust the second object based on the analysis.

DETAILED DESCRIPTION

It should be noted that embodiments of the present invention are described with reference to different embodiments. In particular, some embodiments are described with reference to method type claims. However, a person of ordinary skill in the art will understand from the above and the following description that, unless otherwise noted, in addition to any combination of features belonging to one type of embodiment, any combination of features relating to different embodiments, in particular, features of the method type claims, systems type claims, and computer product type claims are considered disclosed within this document.

The aspects defined above, and further aspects of the present invention, are apparent from the examples of embodiments to be described hereinafter and are explained with reference to the examples of embodiments, but to which the invention is not limited.

In the following, additional embodiments, applicable to the method, computer program product as well as to the related system, will be described.

The embodiments depicted and described herein recognize the need for optimizing the location of touchscreen graphical user interface ("TGUI") objects based on the environmental stimuli surrounding the user. Further, these systems should take into account numerous environmental stimuli, the location of and initial user input on a TGUI, and the subsequent user input commands on a TGUI. The embodiments described herein can be configurable for parameters such as, but not limited to, time of day, decibel level, speed of user vehicle, weather conditions, number of people in the immediate area, age of the user, etc. Other embodiments may provide the capability to access the data of other users TGUI object placement expectations under similar environmental conditions. Further, the embodiments can allow for the TGUI to change the placement of an object to a location the user expects the object to be when surrounded by certain environmental stimuli.

In describing embodiments in detail with reference to the figures, it should be noted that references in the specification to "an embodiment," "other embodiments," etc., indicate that the embodiment may not necessarily include the particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
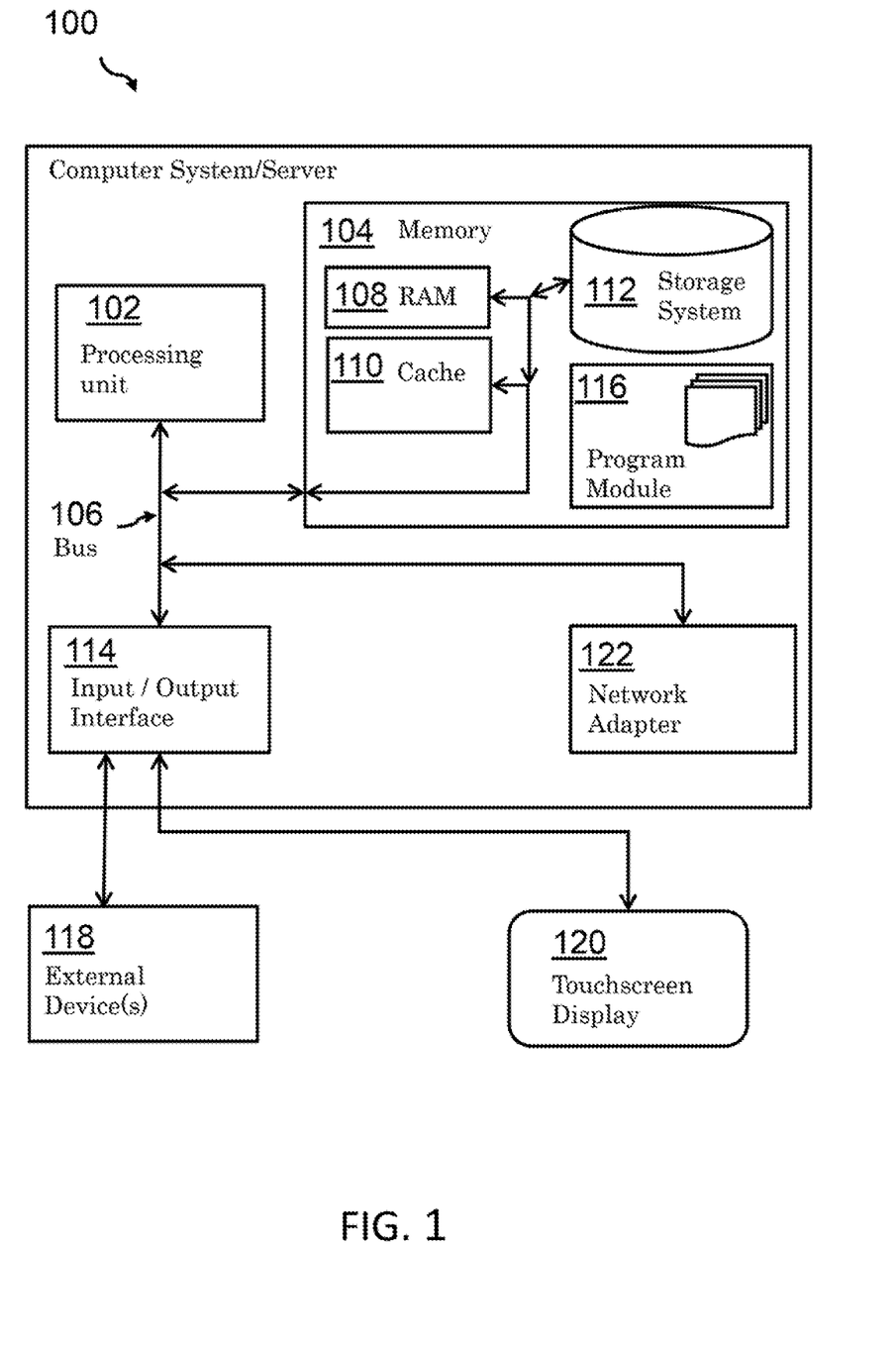
FIG. 1 is a block diagram depicting components of a computer, generally designated 100, suitable for operation of a graphical user interface distraction fault recognition program, in accordance with an embodiment of the present invention.

FIG. 1 shows, as an example, a computing system 100 suitable for executing program code related to the proposed embodiments.

The computing system 100 is only one example of a suitable computer system and is not intended to suggest any limitation as to the scope of use or functionality of embodiments of the invention described herein, regardless, whether the computer system 100 is capable of being implemented and/or performing any of the functionality set forth hereinabove. In the computer system 100, there are components, which are operational with numerous other general purpose or special purpose computing system environments or configurations. Examples of well-known computing systems, environments, and/or configurations that may be suitable for use with computer system/server 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 100 may be described in the general context of computer system-executable instructions, such as program modules, being executed by a computer system 100. Generally, program modules may include routines, programs, objects, components, logic, data structures, and so on that perform particular tasks or implement particular abstract data types. Computer system/server 100 may be practiced in distributed cloud computing environments where tasks are performed by remote processing devices that are linked through a communications network. In a distributed cloud computing environment, program modules may be located in both, local and remote computer system storage media, including memory storage devices.

As shown in the FIG. 1, computer system/server 100 is shown in the form of a general-purpose computing device. The components of computer system/server 100 may include, but are not limited to, one or more processors or processing units 102, a system memory 104, and a bus 106 that couple various system components including system memory 104 to the processor 102. Bus 106 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 100 typically includes a variety of computer system readable media. Such media may be any available media that is accessible by computer system/server 100, and it includes both, volatile and non-volatile media, removable and non-removable media.

The system memory 104 may include computer system readable media in the form of volatile memory, such as random-access memory (RAM) 108 and/or cache memory 110. Computer system/server 100 may further include other removable/non-removable, volatile/non-volatile computer system storage media. By way of example only, a storage system 112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as, but not limited to, a CD-ROM, DVD-ROM or other optical media may be provided. In such instances, each can be connected to bus 106 by one or more data media interfaces. As will be further depicted and described below, memory 104 may include at least one program product having a set (e.g., at least one) of program modules that are configured to carry out the functions of embodiments of the invention.

The program/utility, having a set (at least one) of program modules 116, may be stored in memory 104 by way of example, and not limiting, as well as an operating system, one or more application programs, other program modules, and program data. Each of the operating systems, one or more application programs, other program modules, and program data or some combination thereof, may include an implementation of a networking environment. Program modules 116 generally carry out the functions and/or methodologies of embodiments of the invention, as described herein.

The computer system/server 100 may also communicate with one or more external devices 118 such as a keyboard, a pointing device, a sound recording device, a camera, an accelerometer, a display 120, etc.; one or more devices that enable a user to interact with computer system/server 100; and/or any devices (e.g., network card, modem, etc.) that enable computer system/server 100 to communicate with one or more other computing devices. Such communication can occur via Input/Output (I/O) interfaces 114. Still yet, computer system/server 100 may communicate with one or more networks such as a local area network (LAN), a general wide area network (WAN), and/or a public network (e.g., the Internet) via network adapter 122. As depicted, network adapter 122 may communicate with the other components of the computer system/server 100 via bus 106. It should be understood that, although not shown, other hardware and/or software components could be used in conjunction with computer system/server 100. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of embodiments of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

Figure 2:
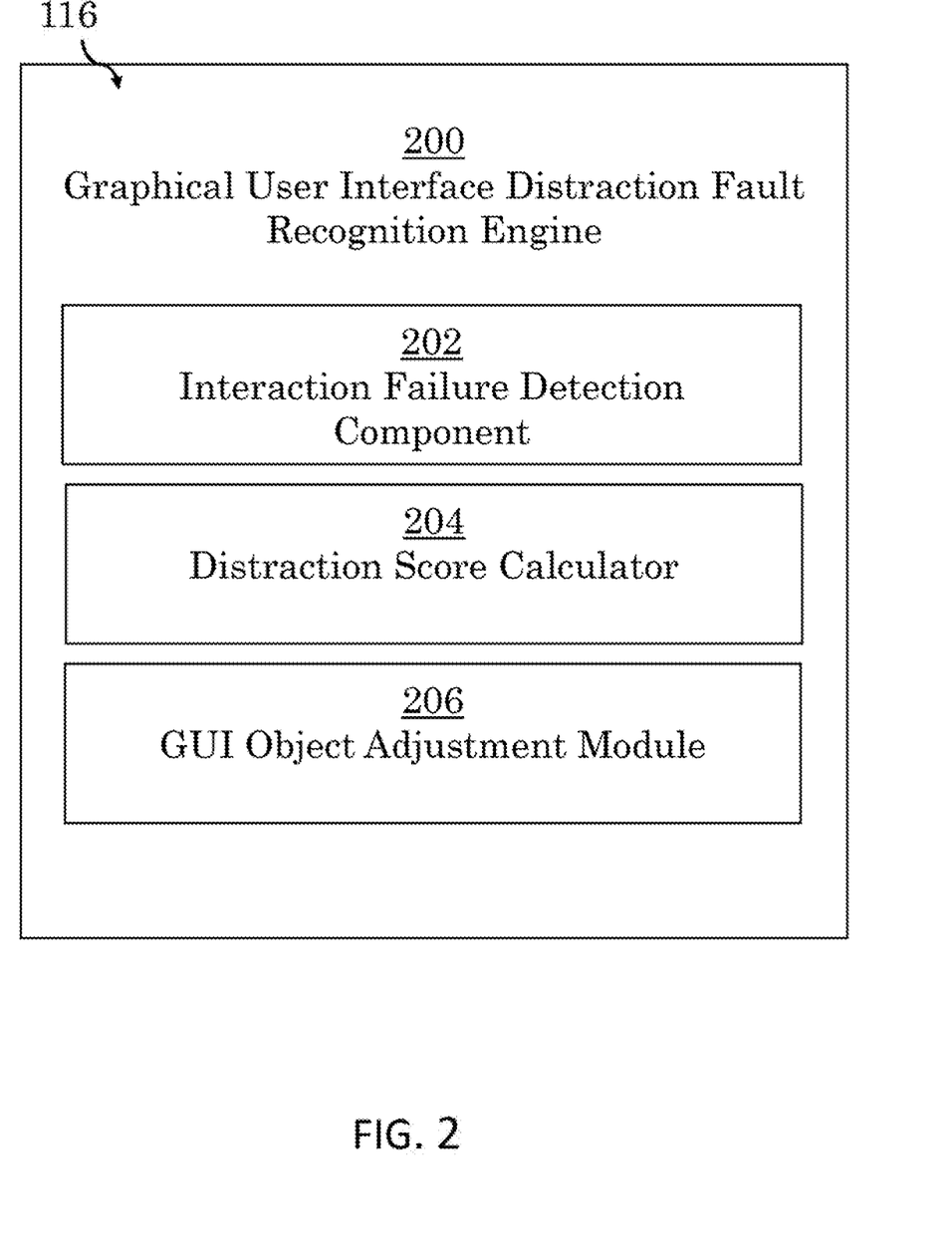
FIG. 2 is a block diagram of graphical user interface distraction fault recognition engine, in accordance with an embodiment of the present invention.

FIG. 2 is a block diagram of a graphical user interface distraction fault recognition engine ("GUIDFRE") 200, further comprising interaction failure detection component 202, distraction score calculator 204, and graphical user interface adjustment engine 206, in accordance with an embodiment of the present invention.

GUIDFRE 200 can provide the capability to receive environmental stimuli in the immediate vicinity of the user through one or more external devices 118. The external devices or sensors can be, but are not limited to, cameras or other devices suitable for capturing visual stimuli and eye gaze data of the user, microphones, accelerometers, thermometers, devices suitable for detecting olfactory stimuli, etc. GUIDFRE 200 can provide the capability to determine a user via numerous identification techniques, including, but not limited to, facial recognition, fingerprint reader identification, and near-field communication ("NFC") ability in which GUIDFRE 200 has permission to access a user's mobile computing device.

Interaction failure detection component ("IFDC") 202 can detect whether a user has made an error in choosing an artifact on a TGUI 120. IFDC 202 can provide the capability to detect an event such as, but not limited to, a user choosing an artifact on a TGUI 120. A user's sequence of actions "A" comprising an associated sequence of frustration levels "F" may be stored along with timestamps of when the actions occurred, i.e., A={$A_1, A_2, A_3, \ldots A_n$}. For example, if John activates a seat warmer artifact on a TGUI 120, deactivates the seat warmer artifact within a predefined time threshold, for example three seconds, then John activates a seat cooler artifact on the TGUI 120 within a predefined time threshold, for example three seconds, the IFDC 202 can detect this interaction as a failure to choose the correct artifact. Accordingly, the IFDC 202 can record the sequence of actions, associated frustration levels and timestamps.

In another example, Chris is in his vehicle with music playing, Chris engages the artifact on the TGUI 120 to change to another song but intended to increase the volume of the speakers. Chris then utters, "oops, oh no" and engages the artifact to return to the original song within a predetermined time threshold. Chris then increases the volume within the predetermined time threshold. The IFDC 202 detects this as a failure to choose the correct artifact and detects Chris' frustration through one or more microphones paired with the GUIDFRE 200. When Chris utters: "oops, oh no", his words can be detected by a natural language processing program, for example but not limited to, Siri by Apple, Alexa by Amazon, or Google Assistant by Google. Further, Chris' frustration can be converted into a vector through feature pruning and assign a weight to the vector. Examples of feature pruning can include but are not limited to reduced error pruning and const complexity pruning. The IFDC 202 can decide to include Chris' frustration level based on the equation $F'>Th_{min}$. Where F' is Chris' frustration level and $Th_{min}$ is the minimum frustration level threshold, for which the IFDC 202 would incorporate frustration into a failure equation.

Another example of when a failure may occur is when Elliot engages the touchscreen, but no artifact is chosen. If Elliot then engages the touchscreen again and selects an artifact, within a given time threshold, the IFDC 202 will recognize the first action as a failure. IFDC 202 will log the TGUI 120 coordinates {x',y'} of both actions and store the pattern history in metadata associated with Elliot.

Distraction score calculator 204 generates a distraction score based on the external environmental stimuli received by GUIDFRE 200. The score may be specific to the immediate stimuli received by the external devices 118 or it may be a generalized score based on a number of factors, such as, but not limited to speed of a vehicle, decibels, temperature, precipitation, etc. The distraction score calculator provides the capability to continuously monitor the environmental stimuli, to more accurately determine the user's level of distraction when entering commands into the TGUI 120. The distraction score may be calculated by extracting specific features from the external devices capable of measuring external stimuli. An example of an equation to calculate a distraction score can be:

$$S = f(x(T) \times y(S) \times z(V)$$

Where S is the distraction score, T is the ambient temperature, S is the speed of the vehicle, V is the sound level in decibels and X, Y, Z are weights assigned based on a type of distraction. It should be noted that the weights can be personalized to a user. In another embodiment of the invention, a deep neural network trained to calculate a distraction score, with data from previous users, may be utilized. Further, in some embodiments of the invention, in a vehicle for example, a microphone may measure a decibel level or if the touchscreen user is having a conversation and convert these distractions into a distraction score. In another embodiment, an accelerometer may detect changes in speed beyond a predetermined threshold or changes in direction beyond a predetermined threshold and may convert these readings into a distraction score. Additionally, a vehicle may contain an eye gaze detector and determine if the operator is viewing the TGUI 120 when engaging or attempting to engage an artifact and assign a score accordingly.

Graphical user interface object adjustment module ("GUIOAM") 206, receives the coordinates of a first interaction event, for example A1, and the coordinates of additional TGUI 120 interactions A2, A3, and so on and adjusts the desired artifacts accordingly. In the case of John above, the distraction score can be calculated, as well as the ambient temperature outside the vehicle may be factored into GUIOAM 206 when determining if and how to adjust the seat cooler artifact. Thus, the seat cooler artifact may be increased in size and the seat warmer artifact may be diminished in size or removed entirely from the TGUI 120, where it can only be accessed by accessing a different folder.

In the case of Chris described above, his desire to engage the volume artifact may result in moving the artifact to the coordinate location Chris expects. In the case of Elliot described above, the new input coordinates {x, y} of the artifact may be compared to the previous coordinates with the following equation $D=\sqrt{(x-x')^2+(y-y')^2}$. Thus, the artifact which Elliot intends to interact with moves distance D closer to where she believed the artifact was located.

GUIOAM 206, may have the capability to self-learn. The self-learning capability may take into account past occurrences when it has been determined that a user was distracted (as described above) and adjust placement of objects within the TGUI 120 to where the user expects the object to be on the TGUI 120. It should be noted, while object is to describe an interactive component on a TGUI, the term artifact may also describe an interactive component on a TGUI and the two will be used interchangeable throughout. The self-learning model may be, but is not limited to, a deep neural network, decision tree, support vector machine, etc. For example, the model may be a bidirectional recurrent neural network in which the failure pattern history is analyzed for a user and the weights associated with various stimuli are continually adjusted to optimize the location of artifacts on TGUI 120.

Figure 3:
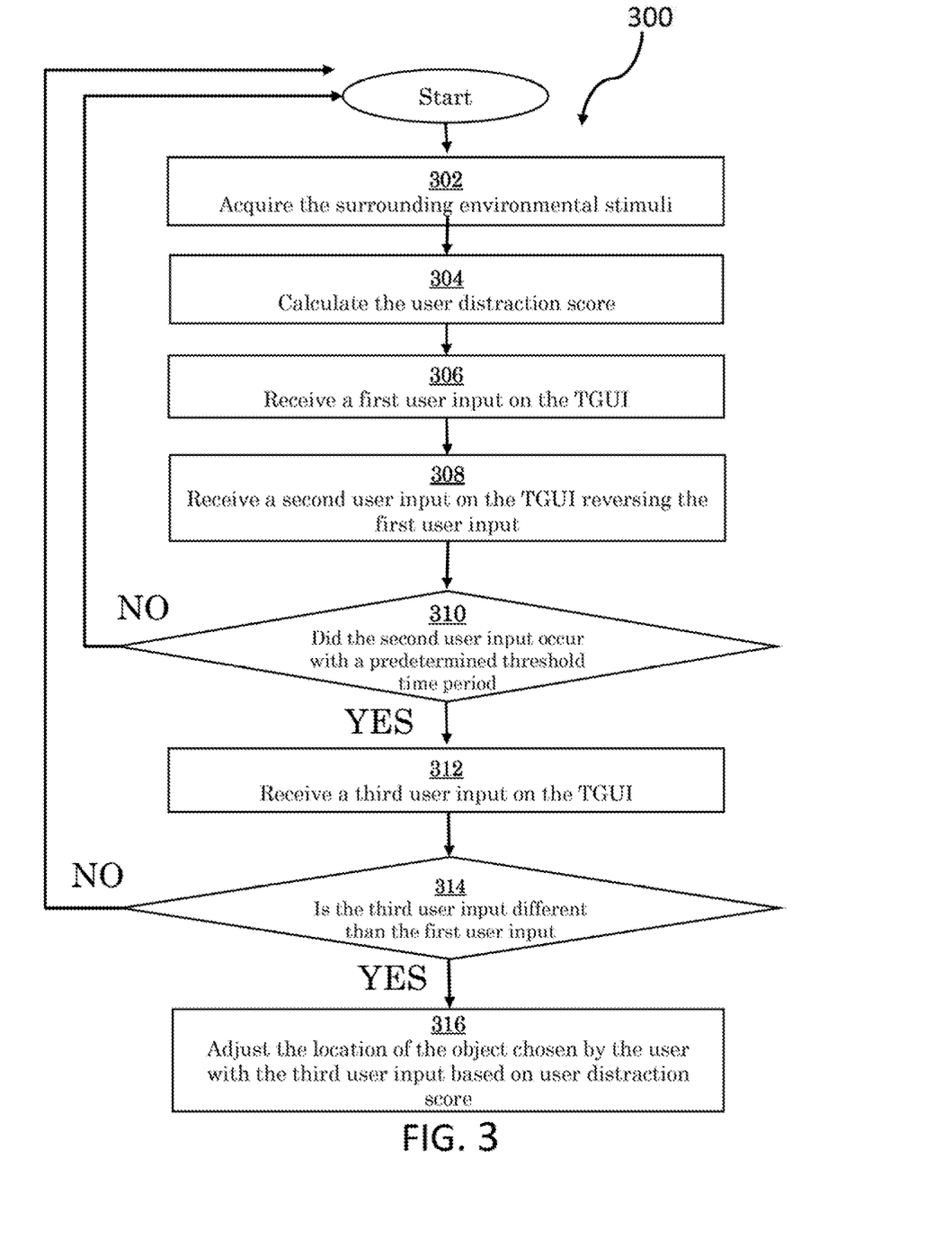
FIG. 3 is a flow chart diagram depicting a computer-implemented method for distraction-based optimization of placement of objects in a graphical user interface, in accordance with an embodiment of the present invention.

FIG. 3 is a flow chart diagram depicting the operational steps of an embodiment of a computer-implemented method for optimizing TGUI 120 object placement when a user is distracted 300. At step 302, acquire the surrounding environmental stimuli through the external devices 118 and record with the GUIDFRE 200. Next at step 304, calculate the user distraction score with the distraction score calculator 204. Next at step 306, receive a first user input on the TGUI 120, recorded by GUIOAM 206. Next at step 308, receive a second user input reversing the first user input on the TGUI 120 recorded by GUIOAM 206. Next at decision tree 310, if the second user input occurs within a predetermined threshold proceed to step 312. If the second user input does not occur within a predetermined threshold, return to step 302. Next at step 312, receive a third user input recorded by GUIOAM 206. Next at decision tree 314, if the third user input is different than the first user input, proceed to step 316. If the third user input is not different from the first user input, return to the step 302. Next at step 316, adjust the placement of the object chosen by the third user input with GUIOAM 206.

In an embodiment of the current invention, a TGUI 120 can be integrated into a medical device or similar devices, which is controlled by the TGUI 120. Medical devices may be placed in numerous settings which can include, but is not limited to sterile surgical suites, hospital rooms, or battlefields. The GUIDFRE 200 can have the capability to discern the environment around it by the sensors and adjust the location of object placement on the TGUI 120. These sensors may include, but are not limited to, thermometers, accelerometers, microphones, cameras, and anemometer. Additionally, the invention may include biometric scanners including but not limited to facial recognition and fingerprint readers to generate a profile of the current user. From this profile, GUIOAM 206 may have the capability to change object placement (e.g. larger artifacts in loud environments, move artifacts to different UI folders if vibrations are detected and the artifact is seldom used, or move an artifact to different coordinates on the screen if travelling at a high rate of speed) on the TGUI 120 based on the distraction score and the profile of the current user.

In yet another embodiment of the current invention, there may be a TGUI 120 integrated into the controls of a motor vehicle or similar device. In this embodiment, the GUIDFRE 200 may possess the capability to access the vehicles speed, Geospatial Positioning System (GPS) data in generating a distraction score of the user. Additionally, the GUIDFRE 200 may provide the capability to access weather data for the immediate area in generating the distraction score of the user.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
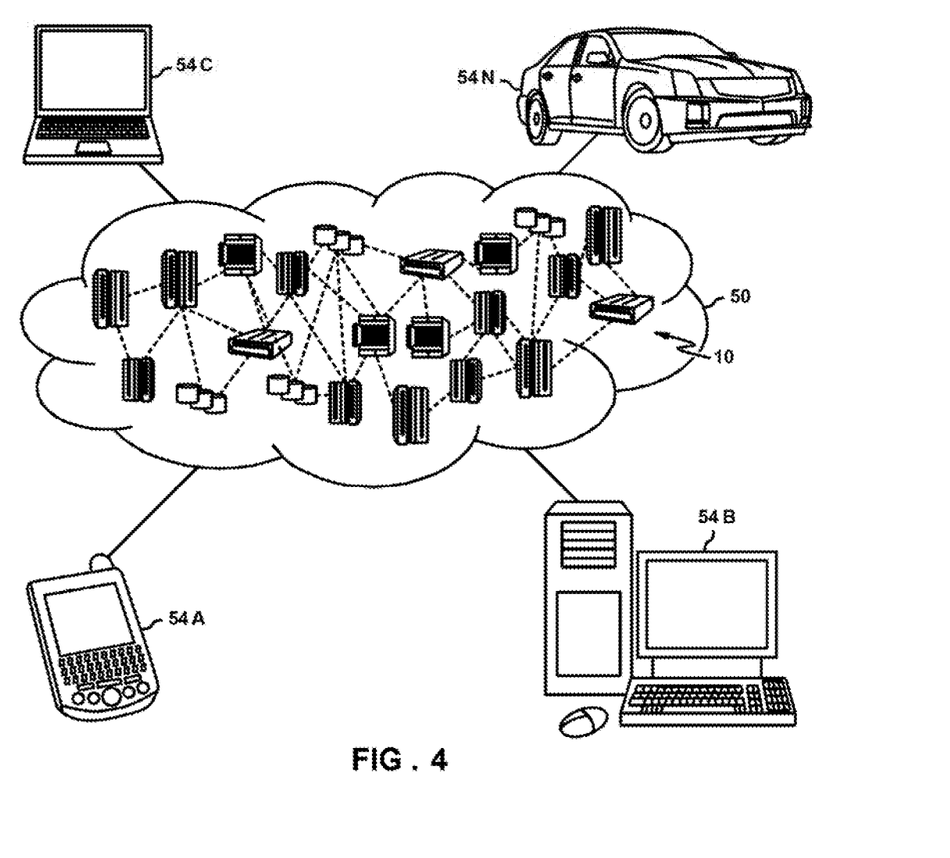
FIG. 4 is a block diagram depicting a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
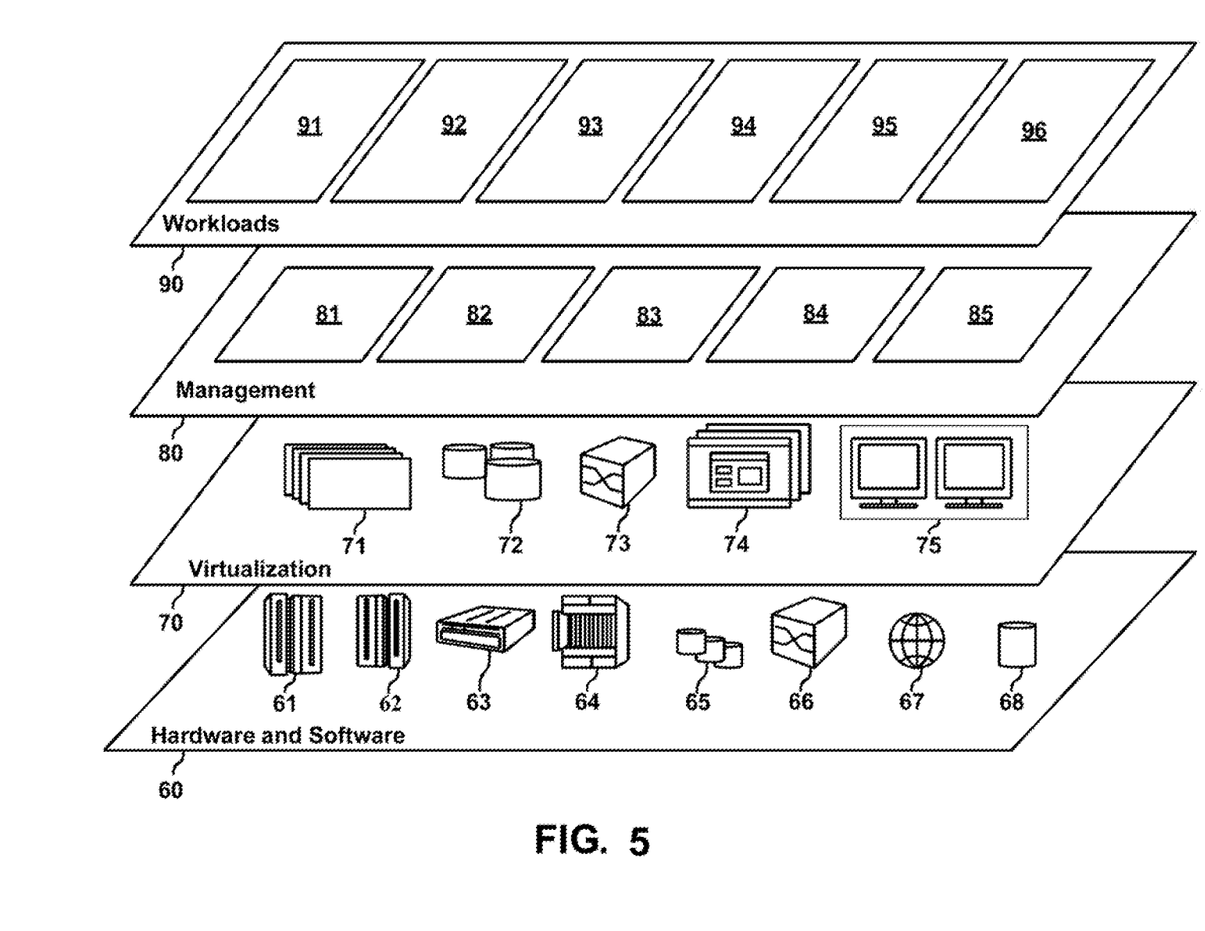
FIG. 5 is a block diagram depicting abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and TGUI object placement optimization program 96.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for optimizing object placement on a graphical user interface (GUI) touchscreen, the computer-implemented method comprising:
    determining, by one or more computer processors, a distraction level associated with a user based on at least one environmental sensor;
    calculating, by the one or more computer processors, a user distraction score based on the level of distraction;
    receiving, by the one or more computer processors, a first user input on a GUI touchscreen corresponding to a first object on the GUI touchscreen;
    receiving, by the one or more computer processors, a second user input on the GUI touchscreen, corresponding to the first object on the GUI touchscreen, within a predetermined time threshold;
    determining, by the one or more computer processors, that the second user input reverses the first user input;
    responsive to the second user input reversing the first user input, receiving, by the one or more computer processors, a third user input on the GUI touchscreen corresponding to a second object on the GUI touchscreen;
    determining, by the one or more computer processors, that the third user input is received within a second predetermined time threshold of receiving the second user input;
    responsive to the third user input being received within the second predetermined time threshold of the second user input, analyzing, by the one or more computer processors, a location of the second object on the GUI touchscreen, wherein the analysis is based on the user distraction score, a first set of coordinates associated with the first user input and a second set of coordinates associated with the third user input;
    adjusting, by the one or more computer processors, the location of the second object on the GUI touchscreen to a plurality of locations based on the analysis; and
    adjusting, by the one or more processors, the size of the second object based on the user distraction score.

2. The computer-implemented method of claim 1, wherein the at least one environmental sensing sensor is a microphone.

3. The computer-implemented method of claim 1, wherein the at least one environmental sensing sensor is a camera.

4. The computer-implemented method of claim 3, wherein determining the user distraction score further comprises:
    receiving, by the one or more processors, images from the camera;
    generating, by the one or more processors, a user gaze tracking data set, based on images from the camera, wherein the user gaze tracking data set is the focus of the user's eyes when the user enters the first input; and
    generating, by the one or more processors, the user distraction score based on the user gaze tracking data set.

5. A computer program product for optimizing object placement on a GUI touchscreen, the program product comprising:
    one or more non-transitory computer readable storage media and program instructions stored on the one or more non-transitory computer readable storage media, the program instructions comprising:
        program instructions to determine a distraction level associated with a user based on at least one environmental sensor;
        program instructions to calculate a user distraction score based on the distraction level;
        program instructions to receive a first user input on a GUI touchscreen corresponding to a first object on the GUI touchscreen;
    program instructions to receive a second user input on the GUI touchscreen within a predetermined time threshold;
    program instructions to determine if the second user input reverses the first user input;
        responsive to the second user input reversing the first user input, program instructions to receive a third user input on the GUI touchscreen corresponding to a second object on the GUI touchscreen;
    program instructions to determine if the third user input is received within a second predetermined time threshold of receiving the second user input;
    responsive to the third user input being received within the second predetermined time threshold of the second user input, program instructions to analyze a location of the second object on the GUI touchscreen, wherein the analysis is based on the user distraction score, a first set of coordinates associated with the first user input and a second set of coordinates associated with the third user input;
        program instructions to adjust the location of the second object on the GUI touchscreen to a plurality of locations based on the analysis; and
        program instructions to adjust the size of the second object based on the user distraction score.

6. The computer program product of claim 5, wherein the at least one environmental sensing sensor is a microphone.

7. The computer program product of claim 5, wherein the at least one environmental sensing sensor is a camera.

8. The computer program product of claim 7, wherein program instructions to determine the user distraction score further comprises:
    program instructions to receive images from the camera;
    program instructions to generate a user gaze tracking data set, based on images from the camera, wherein the user gaze tracking data set is the focus of the user's eyes when the user enters the first input; and
    program instructions to generate the user distraction score based on the user gaze tracking data set.

9. A computer system for optimizing object placement on a GUI touchscreen, comprising:
    one or more computer processors;
    one or more computer readable storage media;
    computer program instructions; and
    the computer program instructions being stored on the one or more computer readable storage media for execution by the one or more computer processors; and the computer program instructions including instructions comprising:
        program instructions to determine a distraction level associated with a user based on at least one environmental sensor;

program instructions to calculate a user distraction score based on the distraction level;
program instructions to receive a first user input on a GUI touchscreen corresponding to a first object on the GUI touchscreen;
program instructions to receive a second user input on the GUI touchscreen within a predetermined time threshold; and
program instructions to determine if the second user input reverses the first user input;
responsive to the second user input reversing the first user input, program instructions to receive a third user input on the GUI touchscreen corresponding to a second object on the GUI touchscreen;
program instructions to determine if the third user input is received within a second predetermined time threshold of receiving the second user input;
responsive to the third user input being received within the second predetermined time threshold of the second user input, program instructions to analyze a location of the second object on the GUI touchscreen, wherein the analysis is based on the user distraction score, a first set of coordinates associated with the first user input and a second set of coordinates associated with the third user input;
program instructions to adjust the location of the second object on the GUI touchscreen to a plurality of locations based on the analysis; and
program instructions to adjust the size of the second object based on the user distraction score.

10. The computer system of claim 9, wherein the at least one environmental sensing sensor is a microphone.

11. The computer system of claim 9, wherein the at least one environmental sensing sensor is a camera.

12. The computer system of claim 9, wherein program instructions to determine the user distraction score further comprises:
program instructions to receive images from the camera;
program instructions to generate a user gaze tracking data set, based on images from the camera, wherein the user gaze tracking data set is the focus of the user's eyes when the user enters the first input; and
program instructions to generate the user distraction score based on the user gaze tracking data set.

* * * * *